US005314162A

United States Patent [19]

Kelley

[11] Patent Number: 5,314,162

[45] Date of Patent: May 24, 1994

[54] SECURITY APPARATUS

[75] Inventor: Donald W. Kelley, Fremont, Calif.

[73] Assignee: Qualtec Data Products, Inc., Fremont, Calif.

[21] Appl. No.: 984,872

[22] Filed: Dec. 2, 1992

[51] Int. Cl.[5] .............................................. F16M 13/00

[52] U.S. Cl. ........................................ 248/553; 70/58; 248/551

[58] Field of Search ........................ 248/551, 552, 553; 70/58, 292; 109/50

[56] References Cited

U.S. PATENT DOCUMENTS

| | | | |
|---|---|---|---|
| 672,390 | 4/1901 | Sudheimer | 248/553 X |
| 3,850,392 | 11/1974 | Gassaway . | |
| 4,065,083 | 12/1977 | Gassaway . | |
| 4,556,188 | 12/1985 | Allison | 70/58 |
| 4,579,311 | 4/1986 | Spranza | 70/58 X |
| 4,712,763 | 12/1987 | Leite | 248/551 X |
| 4,739,637 | 4/1988 | Finkel | 70/58 |
| 4,856,305 | 8/1989 | Adams | 70/58 |
| 5,135,197 | 8/1992 | Kelley et al. . | |
| 5,169,114 | 12/1992 | O'Neill | 248/551 X |

*Primary Examiner*—J. Franklin Foss

*Attorney, Agent, or Firm*—Fliesler, Dubb, Meyer & Lovejoy

[57] ABSTRACT

A security apparatus is provided having a base plate with a loop member and a cover member having a tapered loop engaging member for engaging the loop member on the base plate and forcing the cover member toward the base plate as the cover member is moved horizontally relative to the base plate. The base plate is provided with an adhesive pad for attaching the base plate to an underlying surface. The cover member is provided with locking members for locking the cover member to the base plate when the cover has been moved to a predetermined horizontal position relative to the base plate. Retaining members are further provided for attaching equipment to be protected to the cover member.

11 Claims, 4 Drawing Sheets

FIG. 3
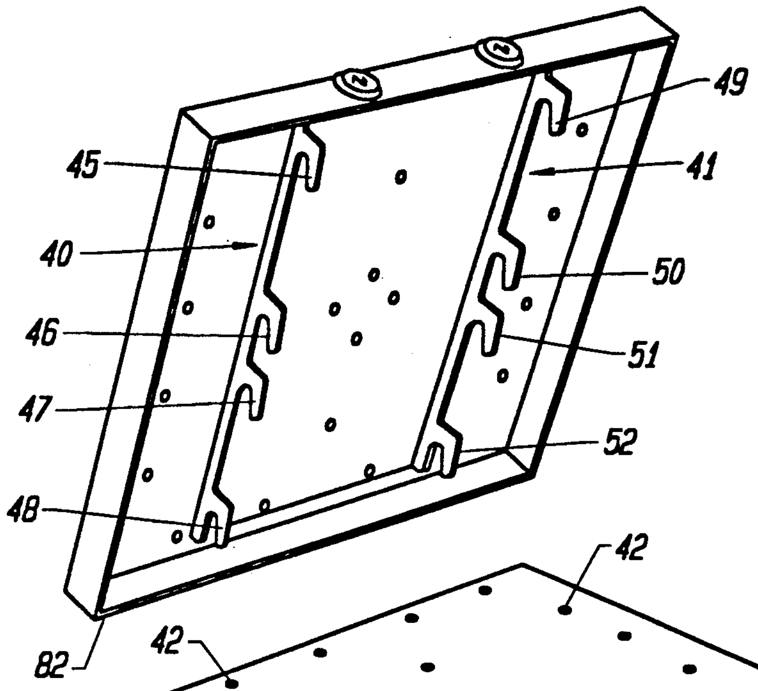
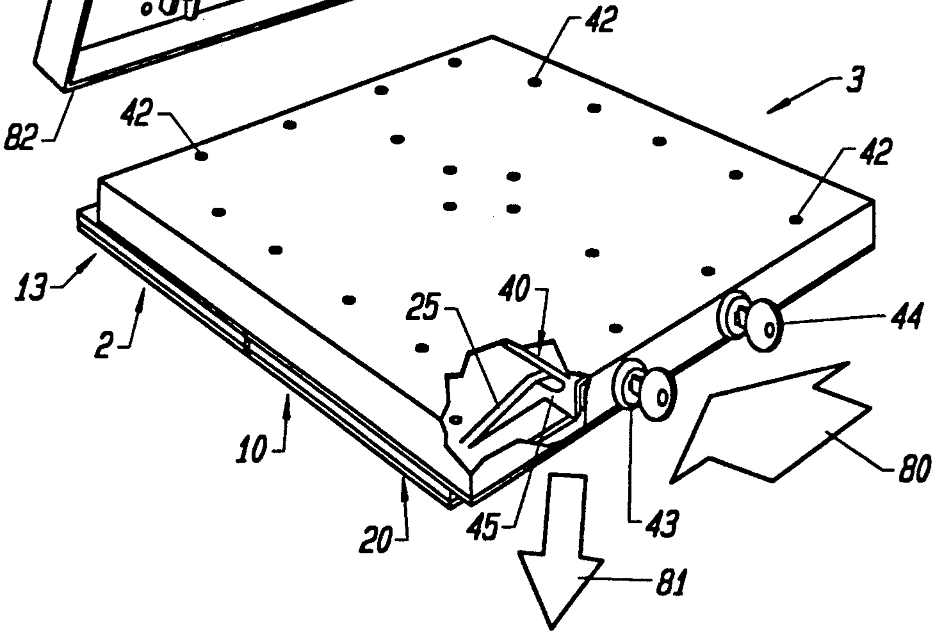
FIG. 2

SECURITY APPARATUS

BACKGROUND OF THE INVENTION

1. Field of the Invention

The present invention relates to security apparatus used for preventing the theft or unauthorized removal of office equipment or the like in general and in particular to security apparatus comprising improved base and key operated cover members to which the office equipment is attached in a secure manner.

2. Description of the Related Art

With the advent of computers, laser printers, facsimile machines, and other expensive but highly portable office equipment, the theft and unauthorized removal of equipment from an office has become a very serious problem and a significant concern to the owners of such equipment. Such concerns are also embraced by the owners of laboratory equipment, the owners of television sets and the like in hotels, hospitals, etc., and the owners of a wide variety of other costly but portable equipment.

To prevent the theft or unauthorized removal of equipment apparatus has been made available to mount or otherwise attach the equipment to a structure which is not readily portable. For example, in applicant's U.S. Pat. No. 5,135,197, entitled Equipment Security Method and Apparatus, assigned to the assignee of the present application, there is provided a base member and a cover member. The base member is attached to a vertical or horizontal surface by means of bolts or adhesive pads, plates and/or brackets as required in a particular installation. The cover member is removably attached to the base member by means of a plurality of pin members which extend inwardly from the rear of the cover member to engage holes provided therefore in the base member and a front mounted key operated lock. The equipment to be secured is attached to the cover member by means of U-shaped rod members, bracket members with inwardly directed fingers for engaging holes in the sides of the equipment or the like.

In U.S. Pat. No. 3,850,392 there is disclosed a security apparatus comprising a plurality of four plate members, each formed with a pair of upwardly extending colinear loops, which are mounted to an underlying surface by means of an adhesive pad, a metallic die cast cover member having die cast cylindrical lock housings and a plurality of downwardly depending lugs, a pair of rod members which are threaded through the loops and the lugs to lock the cover member to the plate members, and a lock associated with each rod member to prevent its unauthorized withdrawal from the security apparatus.

Because the cover member in the above-described security apparatus comprises a die casting it is difficult to inexpensively achieve and maintain tight tolerances and close fits between the mating parts, i.e. the loops, lugs and locking rods, thus allowing for a generally loose fit between the cover member and the base plates. Moreover, because the cover member comprises a die casting it is subject to being broken or shattered if struck by a hammer or the like. Also, because the lock housings likewise comprise die castings, only specially designated locks can be used in the apparatus.

In U.S. Pat. No. 4,065,083 there is disclosed a security apparatus in which arches, i.e. loops, extend upwardly from a base plate to be locked by means of a locking pin or bolt to corresponding-arches or loops which depend downwardly from equipment to be secured in a manner similar to that described above with respect to U.S. Pat. No. 3,850,392. In addition to a single rigid base plate, there is also disclosed a base plate comprising four interconnected, but independently movable, rigid plate members which extend from and are flexibly interconnected by a central portion. The splitting of the single base plate into four smaller interconnected, but independently movable, plate members allows the base plate to more closely conform to the surface to which the base plate is adhesively attached, thus improving the bond between the individual base plate members and the underlying surface.

SUMMARY OF THE INVENTION

In view of the foregoing, a principal object of the present invention is an improved security apparatus comprising an improved base member and an improved cover member.

The base member comprises four centrally interconnected, but independently movable, plate members. Each of the plate members comprises means for adhesively attaching the four plate members to an underlying surface, anti-garroting means for preventing the use of a garrote to cut through the adhesive attaching means and means forming a pair loop members which extend upwardly from each of the plate members.

The cover member comprises a plurality of tapered loop engaging members which correspond in number to the number of loop members on the four base plate members, a pair of key operated lock assemblies for locking the cover member to the base member and a plurality of holes for mounting equipment to be secured to the cover member. Each of the loop engaging members extends downwardly from the cover member for engaging one of the base loop members.

A plurality of retaining members are used to attach equipment to be protected to the cover member. The retaining members comprise a metallic core having a plurality of radially extending petals embedded in a neoprene material or the like, as more fully described in applicant's copending U.S. Pat. application entitled Security Retaining Member, Ser. No. 07/985,009 filed Dec. 2, 1992. The retaining members are used in conjunction with a high tensile strength adhesive and mount bolts or screws for Mounting equipment to be secured to the cover member.

In use, the retaining members are adhesively attached to the base or undersurface of the equipment to be protected and thereafter bolted or otherwise attached to the cover member. The cover member is then fitted to the base member by causing the free ends of the tapered loop engaging members to enter the base plate loops. As the cover member is slid rearwardly relative to the base plate member, the taper of the loop engaging members forces the cover downwardly and tightly against the surface to which the base plate member is attached. When the cover is slid to its fully engaged position, the locks are activated to lock the cover member in place. A protective plastic molding about the bottom edge of the cover member protects the underlying surface as the cover member is moved into place and locked to the plate member.

BRIEF DESCRIPTION OF THE DRAWINGS

The above and other objects, features and advantages of the present invention will become apparent from the following detailed description of the accompanying drawings, in which:

FIG. 2 is a partial cutaway perspective view of the apparatus of FIG. 1;

FIG. 3 is a bottom perspective view of the cover member of the apparatus of FIG. 1;

DESCRIPTION OF THE PREFERRED EMBODIMENTS

Figure 1:
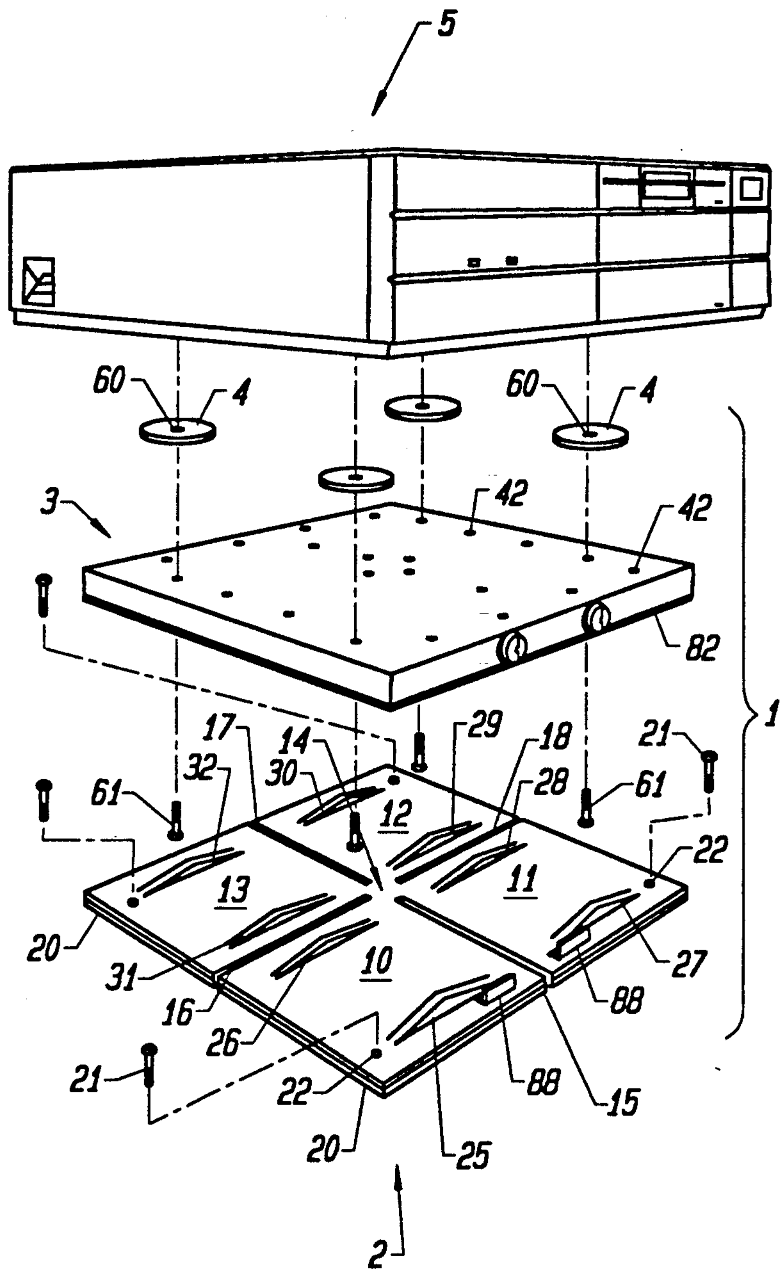
FIG. 1 is an exploded view of a security apparatus in accordance with the present invention.

Referring to FIG. 1, there is provided in accordance with the present invention a security apparatus designated generally as 1 comprising a steel base plate 2, a steel cover member 3 and a plurality of retaining members 4 for protecting equipment 5, such as a computer or the like, from theft or unauthorized removal.

In the base plate 2 there is provided a plurality of four centrally interconnected but independently movable base plate members 10, 11, 12 and 13. The members 1014 13 are interconnected by a central portion 14 which interconnects their four commonly adjacent corners but which allows them to be independently movable in a vertical direction because they are substantially severed one from the other, except for the central portion 14, by cuts 15, 16, 17 and 18. Provided on the bottom surfaces of the plate members 10-13 are adhesive pads 20 for adhesively attaching the four plate members 10-13 to an underlying surface. By being movable in a vertical direction, the members 10-13 conform more readily to the surface to which they are attached and make it more difficult for a thief to remove them because of the resulting reduction of leverage on the other members.

In each of the outside four corners of the plate members 10-13 there is further provided a screw 21 which is threaded in a hole 22. The screw 21 is used for preventing a garrote from cutting through the adhesive attaching means thereby making it even more difficult to remove the plate members, as will be further described below.

In each of the plate members 10-13 there is further provided a pair of loop members 25 and 26, 27 and 28, 29 and 30, 31 and 32, respectively. Each of the loop members 25-32 are made by providing a plurality of parallel cuts in the plate members and bending up the metal therebetween, as shown in FIG. 1.

Referring to FIGS. 2 and 3, there is provided in the cover member 3 two rows 40 and 41 of tapered loop engaging members which extend downwardly from the cover member for engaging the base loop members 25-32, a plurality of holes 42 and a pair of key operated locking members 43 and 44. As shown more clearly in FIG. 3, row 40 of the plurality of tapered loop engaging members comprises four tapered loop engaging members 45, 46, 47, 48. Row 41 comprises a corresponding number of tapered loop engaging members 49, 50, 51, 52. As indicated above, the tapered members 45-52 engage the base plate loop members 25-32, as will be further described below.

Referring again to FIG. 1, each of the retaining members 4 are used in conjunction with an adhesive such as Super Bonder made by Loctite, Newington, Conn., for adhesively attaching the members 4 to the base or undersurface of the equipment 5. The members 4 are each provided with a centrally threaded bore 60 which is used for attaching the members 4 by means of bolts/-screws 61 to the cover 3 using selected ones of the holes 42 in the cover 3. The pattern of the holes 42 in the cover 3 is chosen so as to accommodate a wide variety of different sizes and shapes of equipment. Referring to FIGS. 7-10 the retaining members 4 comprise a neoprene material and are of an improved construction as described in applicant's copending U.S. Pat. application entitled Security Retaining Member, Ser. No. 07/985,004 filed Dec. 2, 1992, comprise a metallic core 22, as of diecast zinc, embedded in a rubber-like material 23, such as 60 durometer neoprene, which may be black in color.

Figure 9:
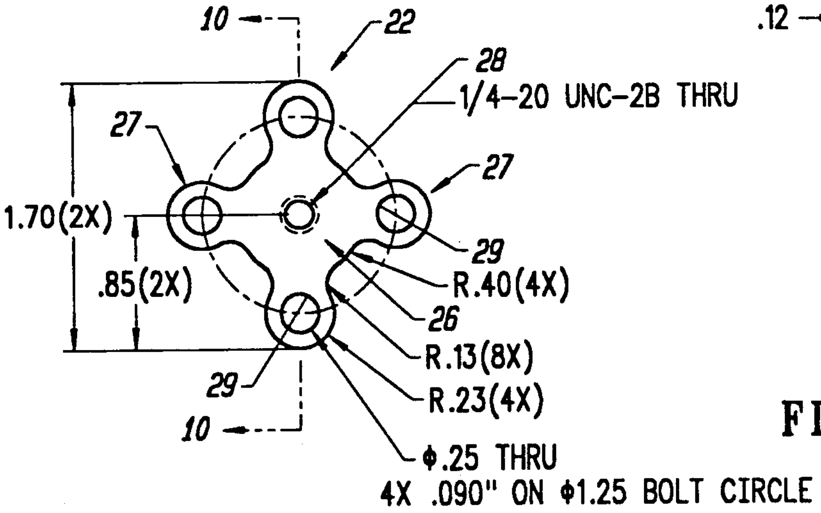
FIG. 9 is a plan view of the core of the retaining member of FIGS. 7 and 8.
Figure 10:
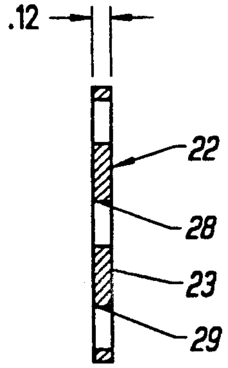
FIG. 10 is a cross-sectional view taken in the direction of lines 10—10 of FIG. 9.

The core 22 comprises a central portion 26 and a plurality of four petal-like portions 27 which extend outwardly from the central portion 26, having a centerline 90 degrees apart as shown most clearly in FIG. 9. In the center of the central portion 26 there is provided a threaded bore or threaded insert 28 having a diameter of approximately 0.25 inch for receiving a suitable fitting or screw for releasably attaching the retaining member to other security apparatus, e.g. housing, cable, or the like. In each of the petal-like portions 27 there is provided a hole 29 having a diameter of approximately 0.25 inch. The centers of the holes 29 in the four petal-like portions 27 lie on a circle having a diameter of approximately 1.25 inches. The overall diameter of the member 4 including the flexible material 23 is approximately 1.90 inches.

In fabricating the member 4, after forming the core 22, the core 22 is embedded in the neoprene material 23 in such a manner that the neoprene material flows through the holes 29 so as to improve and enhance the adherence of the material 23 to the core 22.

Figure 4:
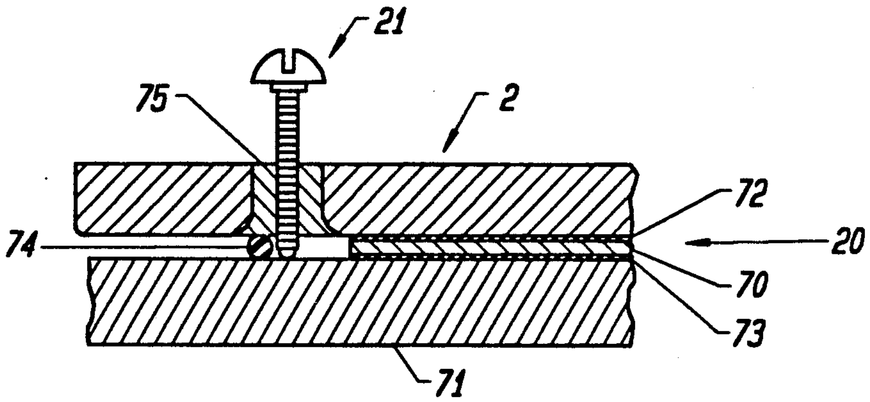
FIG. 4 is a side elevation view of one of the lock assemblies of FIGS. 1-3.

Referring to FIG. 4, pad 20 comprises a layer of closed-cell foam 70 which is used for adhesively attaching the base plate 2 to an underlying surface 71 by means of two layers of adhesive 72 and 73 with a holding force, preferably in excess of 5000 pounds.

Heretofore it was possible to sever the adhesive pad 20 by using a garrote comprising a length of piano wire 74 which was pulled through the adhesive pad 20, cutting the closed-cell foam member 70. To prevent the passage of the garrote through the pad 20, the anti-garrote screw 21 is threaded into an insert 75 and beyond the base plate 2 until it touches or is immediately adjacent to the underlying surface 71 so as to block the garrote 74. By having screws 21 in at least three of the corners of the plate 2, and preferably four of the corners, it is not possible to pass the garrote completely through the adhesive pad 20 underlying the base plate 2.

After the equipment 5 is attached to the cover 3 by means of the retaining members 4 and screws 61, the free ends of the tapered loop engaging members 45-52 are inserted in corresponding ones of the base plate loops 25-32, as shown in FIG. 2, wherein tapered loop 45 is shown engaging base plate loop 25. As cover member 3 is moved in a horizontal direction relative to the base plate 2, as shown by the arrow 80, the tapered surface of the loop engaging members 45-52 bear against the loop members 25-32, forcing the cover member 3 downwardly toward the base plate 2, as shown by the arrow 81. To protect the underlying surface 71 to which the base plate 2 is adhesively attached, there is provided on the edge of the cover 2 a protective plastic molding, or the like, 82. Thus, as the cover member 3 is forced downwardly against the underlying surface 71, the molding 82 prevents the cover member 3 from scratching the surface.

Figure 5:
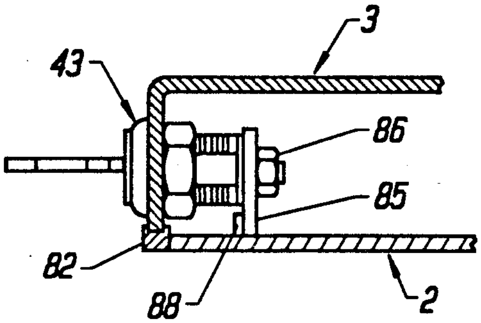
FIG. 5 is an end view of the lock assembly of FIG. 4.
Figure 6:
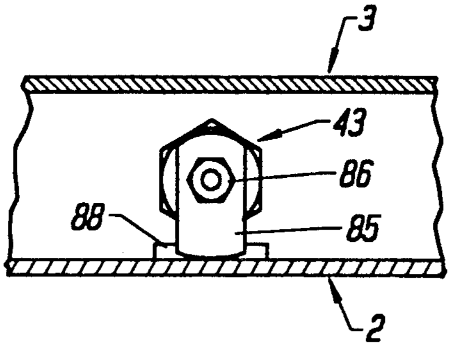
FIG. 6 is a partial cross-sectional view of one of the screw members in the anti-garroting apparatus of FIG. 1.
Figure 7:
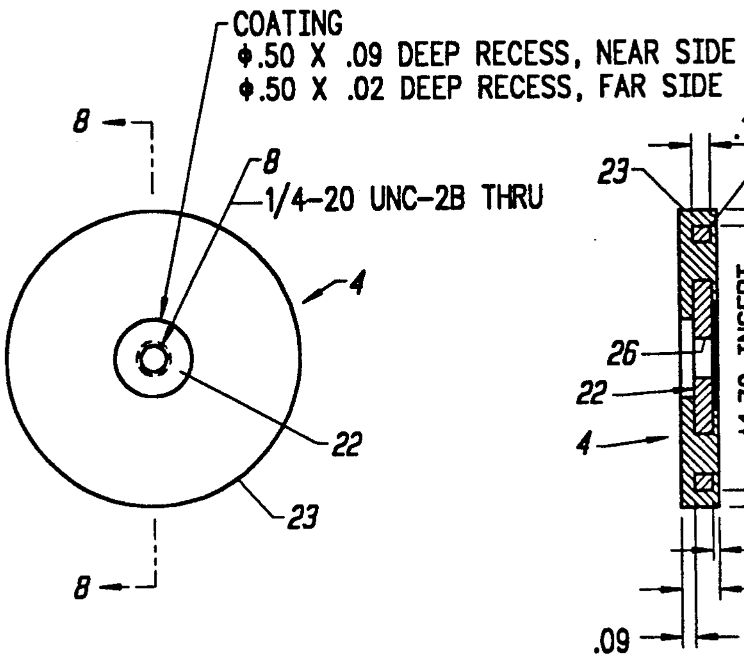
FIG. 7 is a plan view of a security retaining member in accordance with the present invention.
Figure 8:
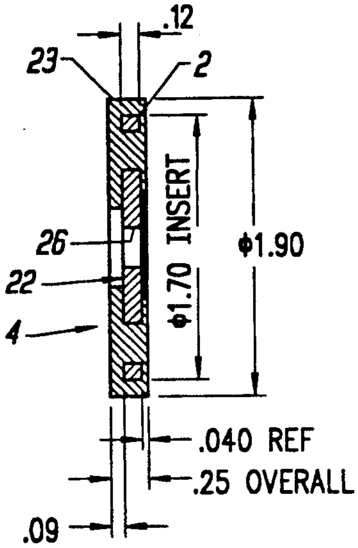
FIG. 8 is a cross-sectional view taken in the direction of lines 8-8 of FIG. 7.

Referring to FIGS. 5 and 6, after the cover member 3 has been moved to a predetermined position horizontally relative to the base plate 2, the locking members 43 and 44 are rotated, locking the cover member 3 to the base plate 2. As shown in FIGS. 5 and 6, as the locks 43 and 44 are rotated (only lock 43 is shown), a blade member 85 attached to the rear of each of the lock assemblies 43,44 by means of a nut 86 is rotated to engage a plate member 88 extending upwardly from the base plate 2, thus locking the cover member to the base plate 2. The member 88 is formed by cutting three sides of a rectangular section of the plate 2 and bending the section upwardly to capture the blade member therebehind when the locks 43,44 are rotated to a closed position.

While a preferred embodiment of the present invention is described above, it is contemplated that numerous modifications may be made thereto for particular applications without departing from the spirit and scope of the present invention. Accordingly, it is intended that the embodiment described be considered only as illustrative of the present invention and that the scope thereof should not be limited thereto but be determined by reference to the claims hereinafter provided.

What is claimed is:

1. A security apparatus comprising:
- a plurality of interconnected metallic base plate members, each of said base plate members being movable relative to each other and having a plurality of loop members, each of said loop members being made by providing a pair of parallel cuts in the base plate member and bending up the metal therebetween;
- a cover member having a tapered loop engaging member for engaging each of the loop members on the base plate members and forcing the cover member toward the base plate members as the cover member is moved horizontally relative to the base plate member;
- means for attaching the base plate members to an underlying surface; and
- means for locking the cover member to the base plate members when the cover member has been moved to a predetermined horizontal position relative to the base plate members.

2. A security apparatus according to claim 1 wherein said base plate member attaching means comprises adhesive attaching means.

3. A security apparatus according to claim 1 comprising:
- means for attaching equipment to be protected to said cover member.

4. A security apparatus according to claim 3. wherein said equipment attaching means comprises:
- a plurality of retaining members,
- means for adhesively attaching the retaining members to equipment to be protected; and
- means for attaching the retaining members to the cover member.

5. A security apparatus according to claim 4 wherein each of said plurality of retaining members comprises neoprene.

6. A security apparatus according to claim 4 wherein said retaining member attaching means comprises:
- means which projects through holes provided therefor in the cover member for engaging said retaining members.

7. A security apparatus according to claim 6 wherein said retaining member engaging means comprises:
- a threaded bore centrally located in each of the retaining members; and
- bolt means for threadably engaging the threaded bore.

8. A security apparatus according to claim 2 comprising:
- means for preventing the use of a garrote to cut through the adhesive attaching means attaching said base plate to an underlying surface.

9. A security apparatus according to claim 8 wherein said preventing means comprises means located at at least three corners of said base plate member for preventing the passage of a garrote beneath said base plate.

10. A security apparatus according to claim 9 wherein said preventing means comprises threaded screw means which can be moved into contact with or adjacent to the underlying surface to which the base plate is attached.

11. A security apparatus comprising:
- a base member having four centrally interconnected, but independently movable, plate members, each of the plate members having a pair of loop members, each of said loop members being made by providing a pair of parallel cuts in the base plate member and bending up the metal therebetween;
- means for adhesively attaching the four base plate members to an underlying surface;
- means for preventing the use of a garrote to cut through the adhesive attaching means;
- a cover member having a plurality of tapered loop engaging members which correspond in number to the number of loop members on the four base plate members, each of the loop members extending downwardly from the cover member for engaging the base plate loop members, and a pair of key operated lock assemblies for locking the cover member to the base member;
- a plurality of retaining members, each of the retaining members having a metallic core with a plurality of radially extending petals embedded in a neoprene-like material;
- means for adhesively attaching the retaining members to equipment to be protected; and
- means for attaching the retaining members to the cover member using holes provided therefor in the cover member.

* * * * *

UNITED STATES PATENT AND TRADEMARK OFFICE
CERTIFICATE OF CORRECTION

PATENT NO. : 5,314,162

DATED : May 24, 1994

INVENTOR(S) : Donald W. Kelley

It is certified that error appears in the above-identified patent and that said Letters Patent is hereby corrected as shown below:

Column 3, line 36, "1014 13" should be --10-13--.
Column 4, lines 19, 20, delete "comprise a neoprene material and are of an improved construction".
Column 4, line 23, "07/985,004" should be --07/985,009--.
Column 6, line 31, "member" should be --members--.

Signed and Sealed this

Twenty-seventh Day of September, 1994

Attest:

BRUCE LEHMAN

Attesting Officer

Commissioner of Patents and Trademarks